(12) United States Patent
Carns et al.

(10) Patent No.: US 7,533,850 B2
(45) Date of Patent: May 19, 2009

(54) FITTINGS WITH REDUNDANT SEALS FOR AIRCRAFT FUEL LINES, FUEL TANKS, AND OTHER SYSTEMS

(75) Inventors: James A. Carns, Wichita, KS (US);
Theron L. Cutler, Wichita, KS (US);
Mark A. Shelly, Bel Aire, KS (US);
Benjamin P. Van Kampen, Wichita, KS (US)

(73) Assignee: The Boeing Company, Chicago, IL (US)

( * ) Notice: Subject to any disclaimer, the term of this patent is extended or adjusted under 35 U.S.C. 154(b) by 604 days.

(21) Appl. No.: 11/301,131

(22) Filed: Dec. 12, 2005

(65) Prior Publication Data

US 2006/0278760 A1 Dec. 14, 2006

Related U.S. Application Data (60) Provisional application No. 60/689,224, filed on Jun. 9, 2005.

(51) Int. Cl.
*B64D 37/32* (2006.01)
(52) U.S. Cl. .................................. 244/135 R
(58) Field of Classification Search ............. 244/135 R, 244/135 A, 135 C, 136, 135 B; 285/136.1, 285/139.1, 139.2, 139.3, 204, 211
See application file for complete search history.

(56) References Cited

U.S. PATENT DOCUMENTS

| 724,675 | A | 4/1903 | Decker |
| 2,091,916 | A | 8/1937 | Evans |
| 2,213,680 | A | 9/1940 | Barnett |
| 2,414,509 | A | 1/1947 | Andre |
| 2,453,553 | A | 11/1948 | Tansley |
| 2,475,635 | A | 7/1949 | Parsons |

(Continued)

FOREIGN PATENT DOCUMENTS

DE 2744674 4/1979

(Continued)

OTHER PUBLICATIONS

European Search Report for EP 06 25 29904; The Boeing Company; Oct. 31, 2006; European Patent Office; 9 pgs.

(Continued)

*Primary Examiner*—Timothy D Collins
(74) *Attorney, Agent, or Firm*—Perkins Coie LLP (57) ABSTRACT

Fittings with redundant seals for aircraft fuel lines, fuel tanks, and other systems are disclosed. A fitting in accordance with one embodiment can be positioned adjacent to an aperture in a fuel tank wall having an inner surface and an outer surface. The fitting can include a first member having a flange and a barrel. The barrel can further include a passageway. A first flange seal can be positioned at a face of the flange and can be sealably coupled to a surface, for example, the tank wall. A second flange seal can be disposed outwardly from the first flange seal against the surface. The fitting can further include a second member (e.g., a sensor) positioned within the passageway of the barrel. The fitting can further include first and second barrel seals positioned between the barrel and the second member.

23 Claims, 6 Drawing Sheets

U.S. PATENT DOCUMENTS

| | | | |
|---|---|---|---|
| 2,552,991 A | 5/1951 | McWhorter | |
| 2,668,066 A | 2/1954 | Stadelhofer | |
| 2,670,913 A | 3/1954 | Castor et al. | |
| 2,712,831 A | 7/1955 | Day | |
| 2,859,002 A | 11/1958 | Leisy | |
| 2,875,787 A | 3/1959 | Evans | |
| 2,879,017 A | 3/1959 | Smith | |
| 2,919,937 A | 1/1960 | Dovey | |
| 2,941,761 A | 6/1960 | Cox et al. | |
| 2,946,543 A | 7/1960 | Gordon et al. | |
| 2,953,332 A | 9/1960 | Cobham et al. | |
| 2,954,190 A | 9/1960 | Le Clair | |
| 2,960,295 A | 11/1960 | Schulz | |
| 2,967,684 A | 1/1961 | Knecht | |
| 2,973,171 A | 2/1961 | Ward et al. | |
| 3,061,246 A | 10/1962 | Kirby | |
| 3,063,470 A | 11/1962 | Forster | |
| 3,091,419 A | 5/1963 | Mosher | |
| 3,103,234 A | 9/1963 | Washburn | |
| 3,108,769 A | 10/1963 | Hieber | |
| 3,181,899 A * | 5/1965 | McKnight, Jr. | 285/139.2 |
| 3,206,232 A * | 9/1965 | Varhanik et al. | 285/139.2 |
| 3,680,311 A | 8/1972 | Harbonn et al. | |
| 3,747,873 A | 7/1973 | Layer et al. | |
| 3,836,117 A | 9/1974 | Panicall | |
| 3,917,196 A | 11/1975 | Pond et al. | |
| 3,928,903 A | 12/1975 | Richardson et al. | |
| 4,044,834 A | 8/1977 | Perkins | |
| 4,072,283 A | 2/1978 | Weiland | |
| 4,088,154 A | 5/1978 | Patton et al. | |
| 4,095,761 A | 6/1978 | Anderson et al. | |
| 4,119,294 A | 10/1978 | Schnorrenberg | |
| 4,129,270 A | 12/1978 | Robinson et al. | |
| 4,149,739 A | 4/1979 | Morris | |
| 4,150,803 A | 4/1979 | Fernandez | |
| 4,231,536 A | 11/1980 | Ishimitsu et al. | |
| 4,236,686 A | 12/1980 | Barthelme et al. | |
| 4,327,784 A | 5/1982 | Denniston | |
| 4,408,943 A | 10/1983 | McTamaney et al. | |
| 4,437,487 A * | 3/1984 | Marmon | 137/322 |
| 4,438,793 A | 3/1984 | Brown | |
| 4,471,809 A | 9/1984 | Thomsen et al. | |
| 4,477,040 A | 10/1984 | Karanik | |
| 4,534,384 A | 8/1985 | Graham et al. | |
| 4,540,144 A | 9/1985 | Perrella | |
| H29 H | 3/1986 | Christou et al. | |
| 4,586,683 A | 5/1986 | Kerker | |
| 4,612,089 A | 9/1986 | Hauptmann | |
| 4,665,936 A | 5/1987 | Furrer | |
| 4,717,099 A | 1/1988 | Hubbard | |
| 4,796,838 A | 1/1989 | Yamamoto | |
| 4,883,102 A | 11/1989 | Gabrielyan et al. | |
| 4,929,000 A | 5/1990 | Annestedt, Sr. | |
| 5,131,438 A | 7/1992 | Loucks | |
| 5,141,178 A | 8/1992 | Alden et al. | |
| 5,255,877 A | 10/1993 | Lindgren et al. | |
| 5,326,052 A | 7/1994 | Krispin et al. | |
| 5,393,015 A | 2/1995 | Piasecki | |
| 5,427,333 A | 6/1995 | Kirkland | |
| 5,449,203 A | 9/1995 | Sharp | |
| 5,449,204 A | 9/1995 | Greene et al. | |
| 5,499,784 A | 3/1996 | Crabere et al. | |
| 5,530,650 A | 6/1996 | Biferno et al. | |
| 5,539,624 A | 7/1996 | Dougherty | |
| 5,573,206 A | 11/1996 | Ward | |
| 5,662,358 A | 9/1997 | Lees et al. | |
| 5,785,276 A | 7/1998 | Ruzicka | |
| 5,810,292 A | 9/1998 | Garcia, Jr. et al. | |
| 5,904,729 A | 5/1999 | Ruzicka | |
| 5,906,336 A | 5/1999 | Eckstein | |
| 5,921,294 A | 7/1999 | Greenhalgh et al. | |
| 5,996,939 A | 12/1999 | Higgs et al. | |
| 6,044,242 A | 3/2000 | Kakiwaki et al. | |
| 6,076,555 A | 6/2000 | Hettinger | |
| 6,119,981 A | 9/2000 | Young et al. | |
| 6,145,788 A | 11/2000 | Mouskis et al. | |
| 6,158,783 A * | 12/2000 | Johnson | 285/205 |
| 6,302,448 B1 | 10/2001 | Van Der Meer et al. | |
| 6,305,336 B1 | 10/2001 | Hara et al. | |
| 6,324,295 B1 | 11/2001 | Valery et al. | |
| 6,326,873 B1 | 12/2001 | Faria | |
| 6,375,123 B1 | 4/2002 | Greenhalgh et al. | |
| 6,428,054 B1 | 8/2002 | Zappa et al. | |
| 6,454,212 B1 | 9/2002 | Bartov | |
| 6,464,173 B1 | 10/2002 | Bandak | |
| 6,467,725 B1 | 10/2002 | Coles et al. | |
| 6,588,465 B1 | 7/2003 | Kirkland et al. | |
| 6,598,830 B1 | 7/2003 | Ambrose et al. | |
| 6,601,800 B2 | 8/2003 | Ollar | |
| 6,604,711 B1 | 8/2003 | Stevens et al. | |
| 6,651,933 B1 | 11/2003 | von Thal et al. | |
| 6,655,136 B2 | 12/2003 | Holt et al. | |
| 6,669,145 B1 | 12/2003 | Green | |
| 6,676,379 B2 | 1/2004 | Eccles et al. | |
| 6,752,357 B2 | 6/2004 | Thal et al. | |
| 6,779,758 B2 | 8/2004 | Vu et al. | |
| 6,796,527 B1 | 9/2004 | Munoz et al. | |
| 6,819,982 B2 | 11/2004 | Doane | |
| 6,824,105 B2 | 11/2004 | Edwards et al. | |
| 6,832,743 B2 | 12/2004 | Schneider et al. | |
| 6,837,462 B2 | 1/2005 | von Thal et al. | |
| 6,838,720 B2 | 1/2005 | Krieger et al. | |
| 6,866,228 B2 | 3/2005 | Bartov | |
| 6,960,750 B2 | 11/2005 | Doane | |
| 6,966,614 B2 | 11/2005 | Hamzeh et al. | |
| 7,024,309 B2 | 4/2006 | Doane | |
| 7,093,801 B2 | 8/2006 | Schroeder | |
| 7,097,139 B2 | 8/2006 | Schroeder | |
| 7,108,015 B2 | 9/2006 | Lombari et al. | |
| 7,188,807 B2 | 3/2007 | Smith | |
| 7,213,787 B2 | 5/2007 | Carns et al. | |
| 7,219,857 B2 | 5/2007 | Tackas | |
| 7,281,687 B2 | 10/2007 | Schroeder | |
| 7,293,741 B2 | 11/2007 | Carns et al. | |
| 7,309,047 B2 | 12/2007 | Crangle | |
| 2003/0038214 A1 | 2/2003 | Bartov | |
| 2003/0097658 A1 | 5/2003 | Richards | |
| 2003/0115863 A1 | 6/2003 | Holt et al. | |
| 2003/0136874 A1 | 7/2003 | Gjerdrum | |
| 2003/0218097 A1 | 11/2003 | Vu et al. | |
| 2004/0026922 A1 | 2/2004 | Carns et al. | |
| 2004/0069904 A1 | 4/2004 | Thal et al. | |
| 2004/0129865 A1 | 7/2004 | Doane | |
| 2004/0195909 A1 | 10/2004 | Hamzeh et al. | |
| 2005/0055143 A1 | 3/2005 | Doane | |
| 2006/0000949 A1 | 1/2006 | Schroeder | |
| 2006/0011782 A1 | 1/2006 | Schroeder | |
| 2006/0038076 A1 | 2/2006 | Schroeder | |
| 2006/0071475 A1 | 4/2006 | James et al. | |
| 2006/0192053 A1 | 8/2006 | Crangle et al. | |
| 2006/0214059 A1 | 9/2006 | Smith | |
| 2006/0278763 A1 | 12/2006 | Carns et al. | |
| 2006/0284019 A1 | 12/2006 | Takacs et al. | |
| 2007/0069071 A1 | 3/2007 | Near et al. | |
| 2007/0102583 A1 | 5/2007 | Cutler et al. | |
| 2007/0215753 A1 | 9/2007 | Schuster et al. | |

FOREIGN PATENT DOCUMENTS

| | | |
|---|---|---|
| DE | 29901583 | 5/1999 |
| DE | 10013751 | 10/2001 |
| EP | 0 236 584 | 9/1987 |
| EP | 780292 | 6/1997 |
| EP | 0807577 | 11/1997 |

| | | |
|---|---|---|
| EP | 1094001 | 4/2001 |
| EP | 1361156 | 11/2003 |
| EP | 1695911 | 8/2006 |
| FR | 2519723 | 5/1965 |
| FR | 2260742 | 9/1975 |
| GB | 555984 | 9/1943 |
| GB | 2257458 | 1/1993 |
| GB | 2298908 | 9/1996 |
| GB | 2373488 | 9/2002 |
| GB | 2405384 | 3/2005 |
| IL | 128459 | 5/2003 |
| RU | 2111154 | 5/1998 |
| RU | 2140381 | 10/1999 |
| RU | 2142897 | 12/1999 |
| SU | 673798 | 7/1979 |
| SU | 953345 | 8/1982 |
| TW | 386966 | 4/2000 |
| WO | WO-85/02003 | 5/1985 |
| WO | WO-91/06471 | 5/1991 |
| WO | WO-97/33792 | 9/1997 |
| WO | WO-98/07623 | 2/1998 |
| WO | WO-98/17938 | 4/1998 |
| WO | WO-98/39208 | 9/1998 |
| WO | WO-98/54053 | 12/1998 |
| WO | WO-02/24529 | 3/2002 |
| WO | WO-02055385 | 7/2002 |
| WO | WO-02/76826 | 10/2002 |
| WO | WO-03/102509 | 12/2003 |

OTHER PUBLICATIONS

European Search Report for EP06252981.3; The Boeing Company; Oct. 17, 2006; European Patent Office; 9 pgs.
Flug Revue, "Airbus (Air Tanker) A330-200 Tanker," Jan. 26, 2004; www.flug-revue.rotor.com/FRTypen/FRA3302T.htm; Motorp-Presse Stuttgart, Bonn, German, (5 pgs).
Keller, George R., "Hydraulic System Analysis", pp. 40-41, 1985, Hydraulics & Pneumatics, Cleveland, Ohio.
Thales Avionics Ltd., "Air Tanker Bids for Future Strategic Tanker Aircraft," Jul. 3, 2001; www.thalesavionics.net/press/pr43.html; (3 pgs).
U.S. Appl. No. 11/090,347, filed Mar. 24, 2005, Speer.
European Search Report for 06252981.3; The Boeing Company; Jan. 18, 2008; European Patent Office; 3 pgs.

* cited by examiner

FITTINGS WITH REDUNDANT SEALS FOR AIRCRAFT FUEL LINES, FUEL TANKS, AND OTHER SYSTEMS

CROSS-REFERENCE TO RELATED APPLICATION

The present application claims priority to U.S. Provisional Application 60/689,224, filed Jun. 9, 2005 and incorporated herein by reference.

TECHNICAL FIELD

The present invention is directed generally toward fittings with redundant seals for aircraft fuel lines, fuel tanks and other systems. Aspects of the invention are also directed to associated methods.

BACKGROUND

Modern aircraft include complex fuel systems that route aviation fuel from fuel tanks to aircraft systems that use the fuel. These aircraft systems can include the primary engines, and/or auxiliary power units (APUs). In the case of an aerial refueling tanker, these systems can also include fuel lines, manifolds, and associated valving necessary for delivering fuel to a receiver aircraft. In some cases, the fuel lines may pass through "ignition zones," which are typically pressurized compartments in the aircraft (e.g., baggage compartments) that may also house electrical devices. Federal Aviation (FAA) regulations require that fuel lines in such areas have redundant seals. However, many existing fuel system devices (e.g., sensors) do not include such a capability. Furthermore, servicing such devices during the course of routine maintenance procedures can be cumbersome. Accordingly, there is a need in the industry for fuel line components that include redundant seals and are easily serviceable.

SUMMARY

The following summary is provided for the benefit of the reader only, and is not intended to limit in any way the invention as set forth by the claims. The present invention is directed generally to fluid fittings and associated systems and methods. A fluid fitting in accordance with one aspect of the invention includes a first member having a flange and a barrel, the barrel having a passageway. A first flange seal can be positioned at a face of the flange so as to sealably couple to a surface. A second flange seal can be positioned at the flange face and can be disposed outwardly from the first flange seal to sealably couple to the surface. The fitting can further include a second member positioned within the passageway of the barrel. First and second barrel seals positioned between the barrel and the second member can seal the interface between the first and second members. Accordingly, the fitting can provide for redundantly sealed, fluid-tight connections.

In further particular embodiments, a fitting having characteristics generally similar to those described above can be attached to a fuel tank having a tank wall with an inner surface, an outer surface, and an aperture extending from the inner surface to the outer surface. A first portion of the barrel can extend through the tank aperture and can be secured to the tank wall with a fastener. A second portion of the barrel can extend away from the tank aperture. The second member can be positioned within the passageway of the barrel, and in at least some instances, can include a sensor, for example, a pressure sensor.

Still further aspects of the invention are directed to methods for installing a fluid fitting. A method in accordance with one aspect of the invention includes coupling a first member of a fitting proximate to an aperture in a wall. The wall can separate a first region from a second region, with the aperture extending through the wall from the first region to the second region. The method can further include securing the first member relative to the wall, and placing a flange of the first member proximate to the wall in the second region, with a first flange seal and a second flange seal positioned between the flange and the wall. The method can further include inserting a second member of the fitting into a passageway of the barrel, with the passageway in fluid communication with the first region. The method can still further include sealing an interface between the second member and the passageway with a first barrel seal and a second barrel seal. In further particular aspects of the invention, the second member of the fitting can be removed from the passageway without accessing the first region. Accordingly, the fitting can include a redundant sealing capability, and can be easily serviced without accessing both sides of the wall to which the fitting is attached.

DETAILED DESCRIPTION

The present disclosure describes fittings with redundant seals for use in aircraft fuel lines and other systems, and also discloses associated methods. Certain specific details are set forth in the following description and in FIGS. 1-7 to provide a thorough understanding of various embodiments of the invention. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Figure 1:
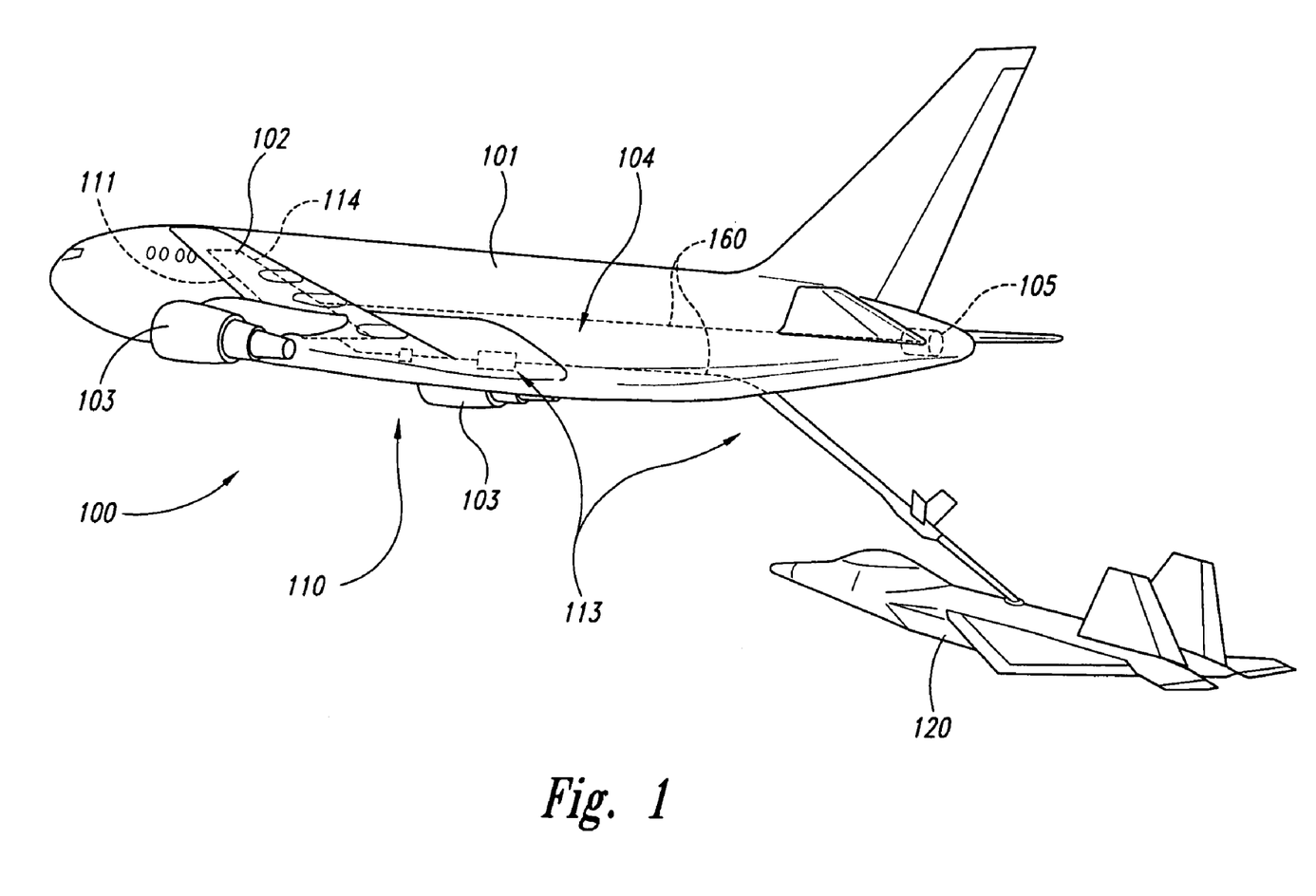
FIG. 1 is a partially schematic, isometric illustration of an aircraft having a fuel system that includes fittings configured in accordance with an embodiment of the invention.

FIG. 1 illustrates an aircraft 100 (e.g., a refueling aircraft) in the process of refueling a receiver aircraft 120. The aircraft 100 can include a fuselage 101, wings 102, and one or more engines 103 (two are shown in FIG. 1 as being carried by the wings 102). In other embodiments, the aircraft 100 can have other configurations, and in at least some embodiments, need not include a refueling capability. In a particular aspect of the embodiment shown in FIG. 1, the aircraft 100 includes a fuel system 110 having wing-mounted fuel tanks 111 (and/or other fuel tanks) and fuel lines 160 that provide fuel to other aircraft systems. These systems can include the engines 103, an auxiliary power unit (APU) 105, and an aerial refueling system 113. The fuel lines 160 may pass through pressurized compartments 104. In at least some instances, the fuel system 110 includes devices (e.g., sensors) that require access through a tank wall 114 of the fuel tanks 111. Aspects of the invention are directed to fittings that support such an installation (and others as well), and that include redundant seals, as described in greater detail below with reference to FIGS. 2-7.

Figure 2:
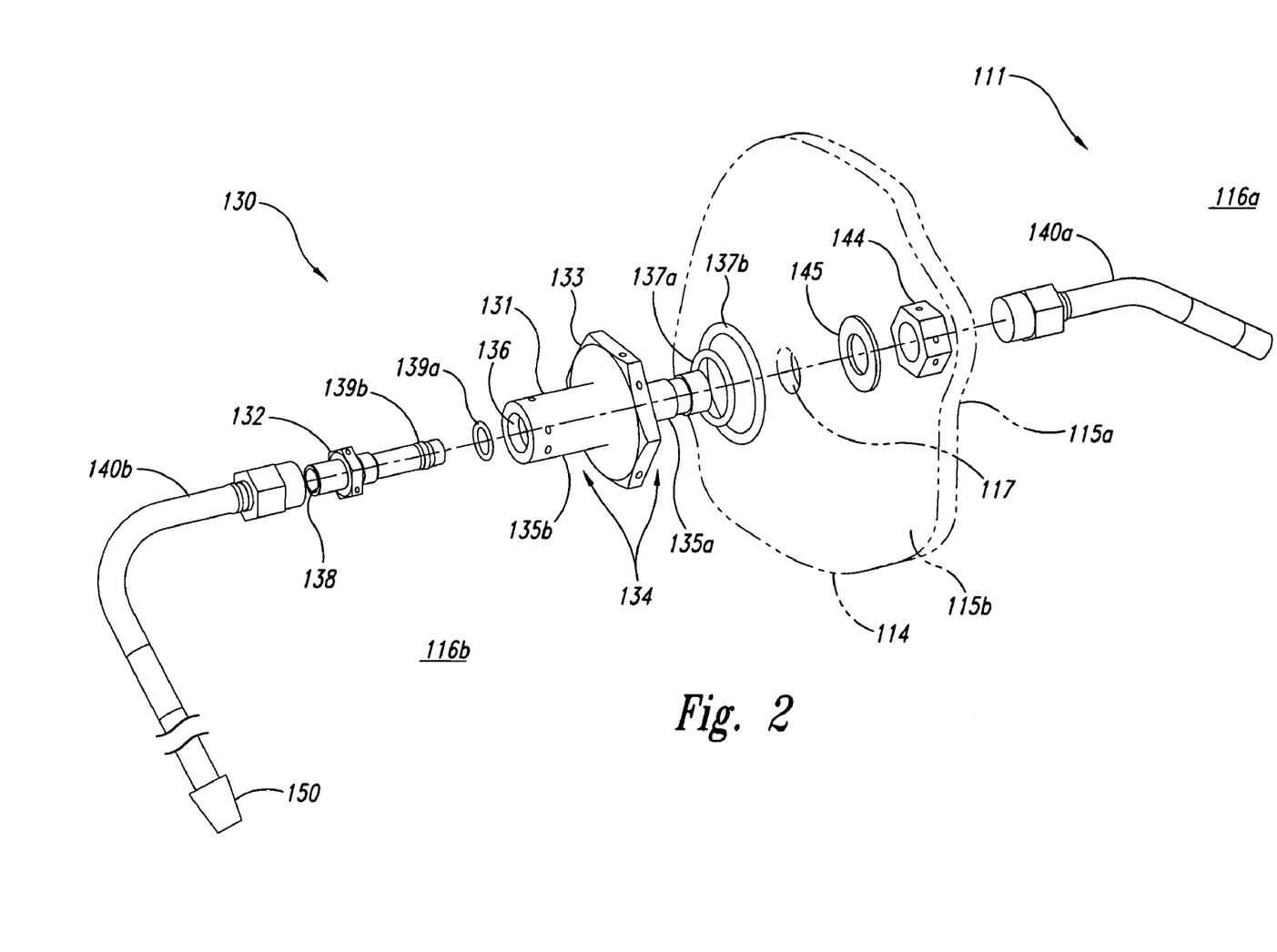
FIG. 2 is a partially schematic, exploded view of a fitting configured in accordance with an embodiment of the invention.

FIG. 2 is a partially schematic, exploded illustration of a fitting 130 that can be coupled to the tank wall 114 or another structure in accordance with an embodiment of the invention. The tank wall 114 can include oppositely facing first and second surfaces 115a, 115b, and can separate a first region 116a from a second region 116b. The first region 116a can include a region internal to a fuel tank 111, and the second region 116b can include a region external to the fuel tank 111. The tank wall 114 can include an aperture 117 that extends from the first surface 115a to the second surface 115b and allows for fluid communication with the first region 116a.

A fitting 130 can provide a redundantly sealed connection between the aperture 117 and other systems or devices that require access to the first region 116a. Such devices can include sensors 150 (e.g., pressure sensors or temperature sensors), bleed valves, or other external devices. In some cases, both the external device and an associated access point within the fuel tank 111 are remote from the aperture 117. In such instances, the fitting 130 can be coupled to a first conduit 140a that extends into the interior of the fuel tank 111, and a second conduit 140b that extends away from the fuel tank 111 in the second region 116b. In other embodiments, either or both of these conduits 140a, 140b may be eliminated.

In any of the foregoing embodiments, the fitting 130 can include a first member 131 sealably connected to the tank wall 114, and a second member 132 sealably connected to the first member 131. Accordingly, the first member 131 can include a barrel 134 having a first portion 135a that extends into the first region 116a, and a second portion 135b that extends into the second region 116b. The barrel 134 can include a first passageway 136 that provides for fluid communication with the first region 116a. The first portion 135a can be threaded so as to be secured to the tank wall 114 with a fastener 144 (e.g., a nut) and an optional washer 145.

The first member 131 can also include a flange 133 that faces toward the second surface 115b of the tank wall 114. Two flange seals 137 (shown as a first flange seal 137a and a second flange seal 137b) sealably couple the flange 133 to the second surface 115b. Accordingly, the two flange seals 137 can provide a redundant sealing arrangement between the first member 131 and the aperture 117.

The second member 132 can extend at least partially into the first passageway 136 of the first member 131. The second member 132 can include two barrel seals 139 (shown as a first barrel seal 139a and a second barrel seal 139b) that seal the interface between the second member 132 and the first member 131. The second member 132 can also include an internal second passageway 138 that is in fluid communication with the first passageway 136.

Figure 3A:
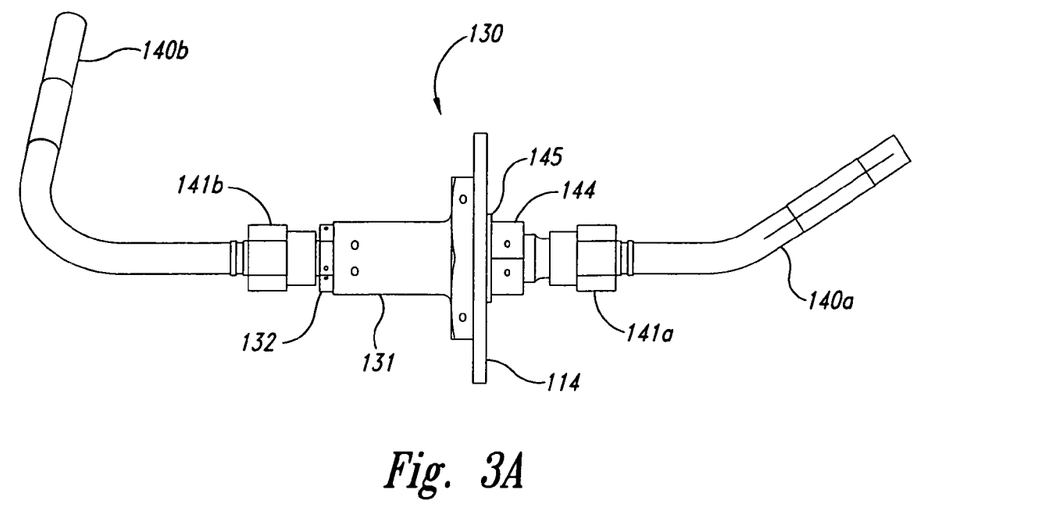
FIGS. 3A and 3B illustrate an external side view and a cross-sectional side view, respectively, of a fitting assembled in accordance with an embodiment of the invention.
Figure 3B:
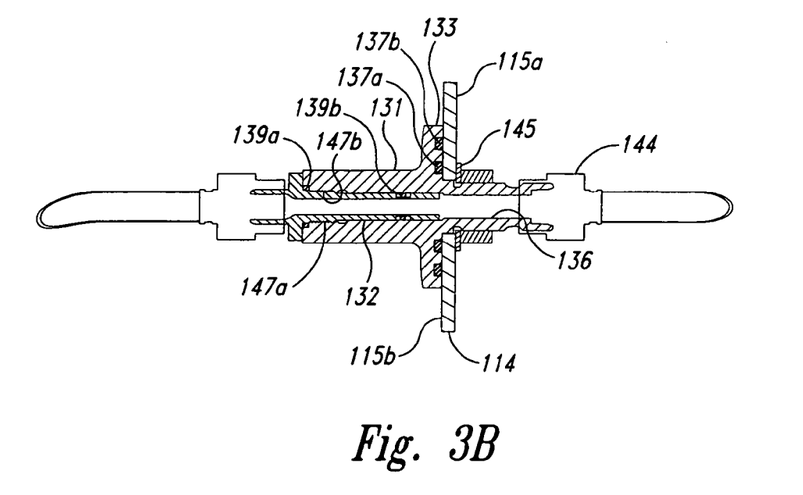

FIGS. 3A and 3B illustrate an external side view and a side cross-sectional view, respectively, of the fitting 130 in its assembled state. Referring first to FIG. 3A, the second member 132 is received in the first member 131. The first conduit 140a can be attached to the first member 131 with a first coupling 141a and the second conduit 140b can be attached to the second member 132 with a second coupling 141b. The first and second conduits 140a, 140b can be shrouded (e.g., double-walled) or unshrouded.

Referring next to FIG. 3B, the first member 131 can be securely engaged with the tank wall 114 by tightening the fastener 144 until the first and second flange seals 137a, 137b provide a fluid-tight seal between the flange 133 and the second surface 115b of the tank wall 114. The second member 132 can be inserted into the first passageway 136 and connected to the first member 131 by engaging external threads 147a of the second member 132 with internal threads 147b of the first member 131. The first and second barrel seals 139a, 139b seal the interface between the second member 132 and the internal surfaces of the first passageway 136. Further details of the barrel seals 139a, 139b are described below with reference to FIGS. 4A and 4B.

Figure 4A:
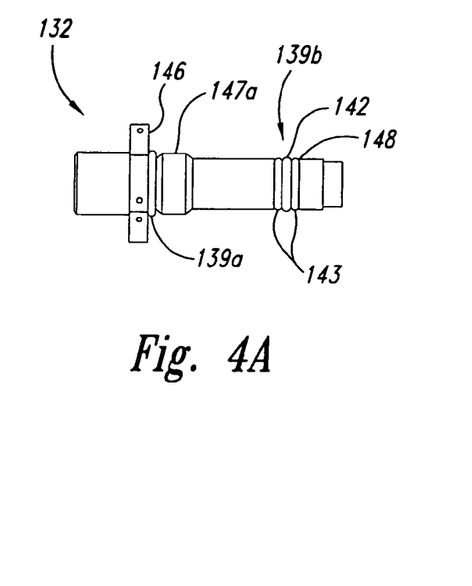
FIGS. 4A and 4B illustrate an external side view and a cross-sectional side view, respectively, of a second member of a fitting configured in accordance with an embodiment of the invention.
Figure 4B:
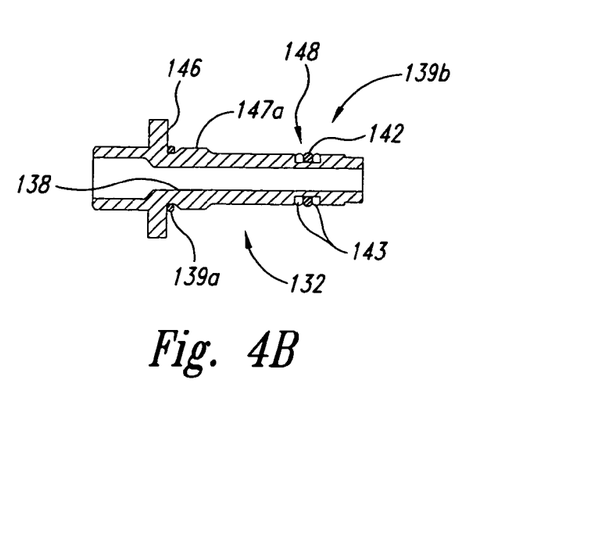
Figure 5:
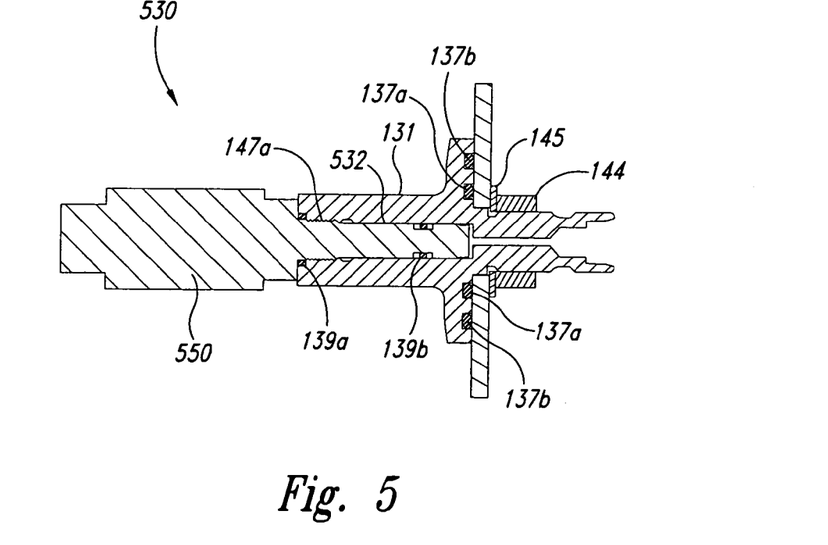
FIG. 5 illustrates a cross-sectional side view of a fitting that includes a sensor configured in accordance with another embodiment of the invention.

FIGS. 4A and 4B illustrate an external side view and a side cross-sectional view, respectively, of the second member 132. The first and second barrel seals 139a, 139b can provide for a redundantly sealed connection with the first member 131 (FIG. 3B). The first barrel seal 139a can include an O-ring positioned between the external threads 147a and a seat 146. Accordingly, the first barrel seal 139a can be captive and will be unlikely to move when the second member 132 is installed or removed. The second barrel seal 139b can be positioned in a seal groove 148 and can include an O-ring 142 positioned between two backup rings 143. The backup rings 143 can prevent or at least restrict the O-ring 142 from moving out of the seal groove 148 when the second member 132 is installed and/or removed.

In an embodiment described above with reference to FIG. 2, the fitting 130 can provide a connection to a remote sensor 150. In other embodiments, the sensor can be integrated with the second member 132, and the second conduit 140b shown in FIG. 2 can be eliminated. For example, referring now to FIG. 5, a fitting 530 configured in accordance with another embodiment of the invention includes a first member 131 generally similar to the first member 131 described above with reference to FIGS. 2-3B, and a second member 532 that includes an integrated sensor 550. The sensor 550 can include a pressure transducer, temperature sensor or other sensor. Suitable sensors are available from Kulite Semiconductor Products, Inc., of Leonia, N.J. Other aspects of the second member 532 (e.g., the first and second barrel seals 139a, 139b) and the threaded attachment with the first member 131 can be generally similar to those described above.

In still further embodiments, the fitting 530 can have other configurations. For example, the fitting 530 can combine aspects of the arrangement shown in FIG. 2 with aspects of the arrangement shown in FIG. 5. In particular, the fitting 530 can include an integral sensor 550, but can also include the capability for coupling to a second conduit 140b (FIG. 2) that can in turn be coupled to additional remote sensors or can be used for other purposes. Accordingly, the fitting 530 can include second member 532 having a through-passage generally similar to the second passageway 138.

Figure 6A:
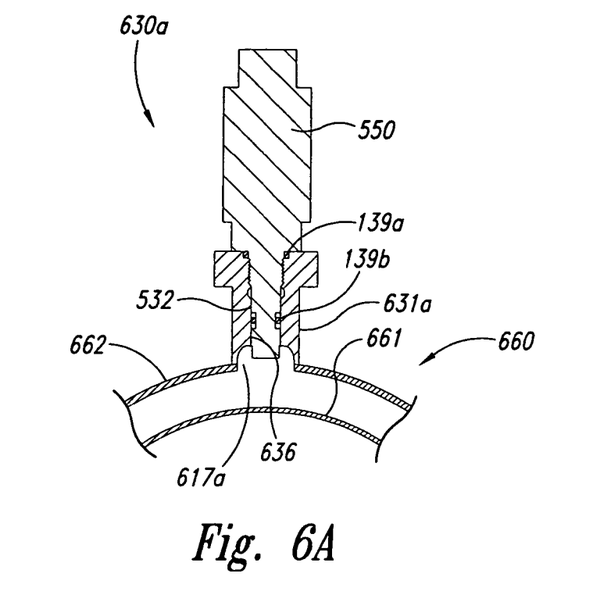
FIGS. 6A and 6B are partially schematic, cross-sectional illustrations of fittings that include sensors coupled to shrouded conduits in accordance with further embodiments of the invention.

FIG. 6A illustrates a fitting 630a coupled to a conduit 660 (e.g., a fuel line) in accordance with another embodiment of the invention. The conduit 660 can have a shrouded arrangement and can accordingly include an inner conduit 661 with an outer conduit 662 disposed annularly outwardly from the inner conduit 661. The outer conduit 662 can be provided to capture fluid that may inadvertently leak from the inner conduit 661.

In at least one aspect of an embodiment shown in FIG. 6A, the fitting 630a can include a sensor 550 configured to detect leaks from the inner conduit 661 to the outer conduit 662. Accordingly, the outer conduit 662 can include an aperture 617a through which evidence of such a leak may be communicated. The fitting 630a can include a first member 631a that is integrally connected or attached to the outer conduit 662 around the aperture 617a. Accordingly, the first member 631a need not include redundant flange seals such as those described above with reference to FIGS. 2-3B. The first member 631a can be attached to a second member 532 that is generally similar to the second member 532 described above with reference to FIG. 5. Accordingly, the second member 532 can include an integral sensor 550 having a barrel portion, along with first and second barrel seals 139a, 139b that seal an interface with a corresponding first passageway 636 in the first member 631. In another embodiment, the second member 532 with its integral sensor 550 can be replaced with a second member 132 generally similar to that described above with reference to FIGS. 2-4B to allow coupling to a remote sensor or other device.

Figure 6B:
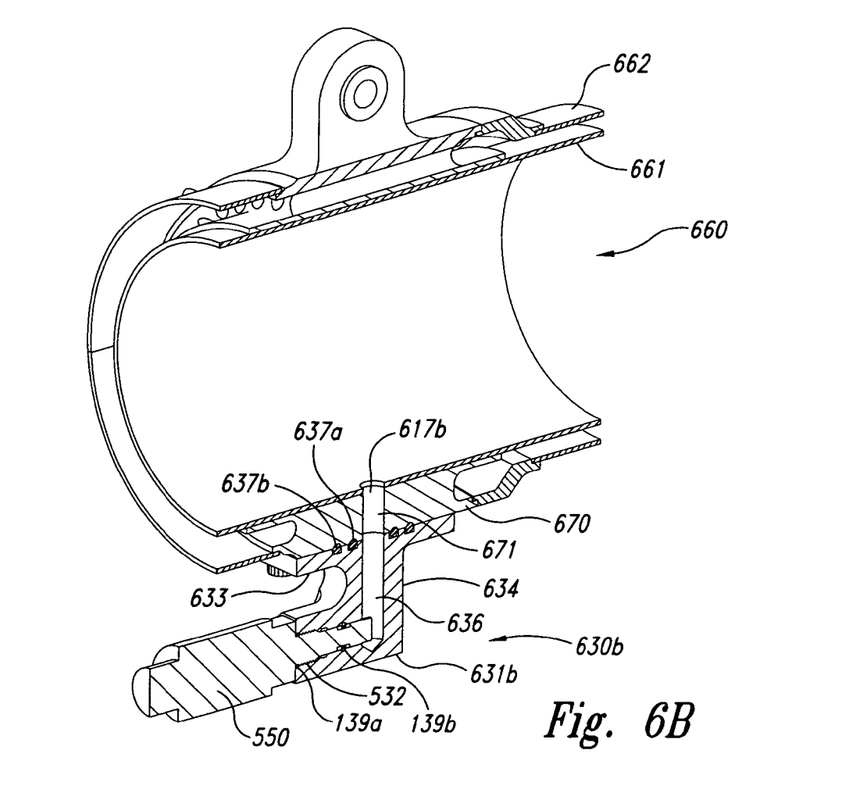

FIG. 6B is a partially cut away, isometric illustration of a fitting 630b connected to the conduit 660 in accordance with another embodiment of the invention. In one aspect of this embodiment, the fitting 630b provides fluid communication with the inner conduit 661, but not the outer conduit 662. Accordingly, the inner conduit 661 can include an aperture 617b. A channel housing 670 having a channel 671 can be coupled to the conduit 660 so that the channel 671 is in fluid communication with the aperture 617b, but is isolated from fluid communication with the outer conduit 662. The fitting 630b can include a first member 631b that attaches to the channel housing 670. Accordingly, the first member 631b can include a barrel 634 having a first passageway 636 that is aligned with the channel 671 and the channel housing 670. The first member 631b can further include a flange 633 positioned against the channel housing 670. First and second flange seals 637a, 637b provide a redundant seal arrangement between the channel 671 and the first passageway 636. The fitting 630b can also include a second member 532 generally similar to that described above. The second member 532 can connect with the first member 631b in a manner generally similar to that described above, and can include an integrated sensor 550. In other embodiments, the second member 532 can include a through-passage generally similar to that shown in FIG. 2, in addition to or in lieu of the integrated sensor 550. In either of these embodiments, the second member 532 can include redundant first and second barrel seals 139a, 139b that provide a sealable connection between the second member 532 and the first member 631b.

Figure 7:
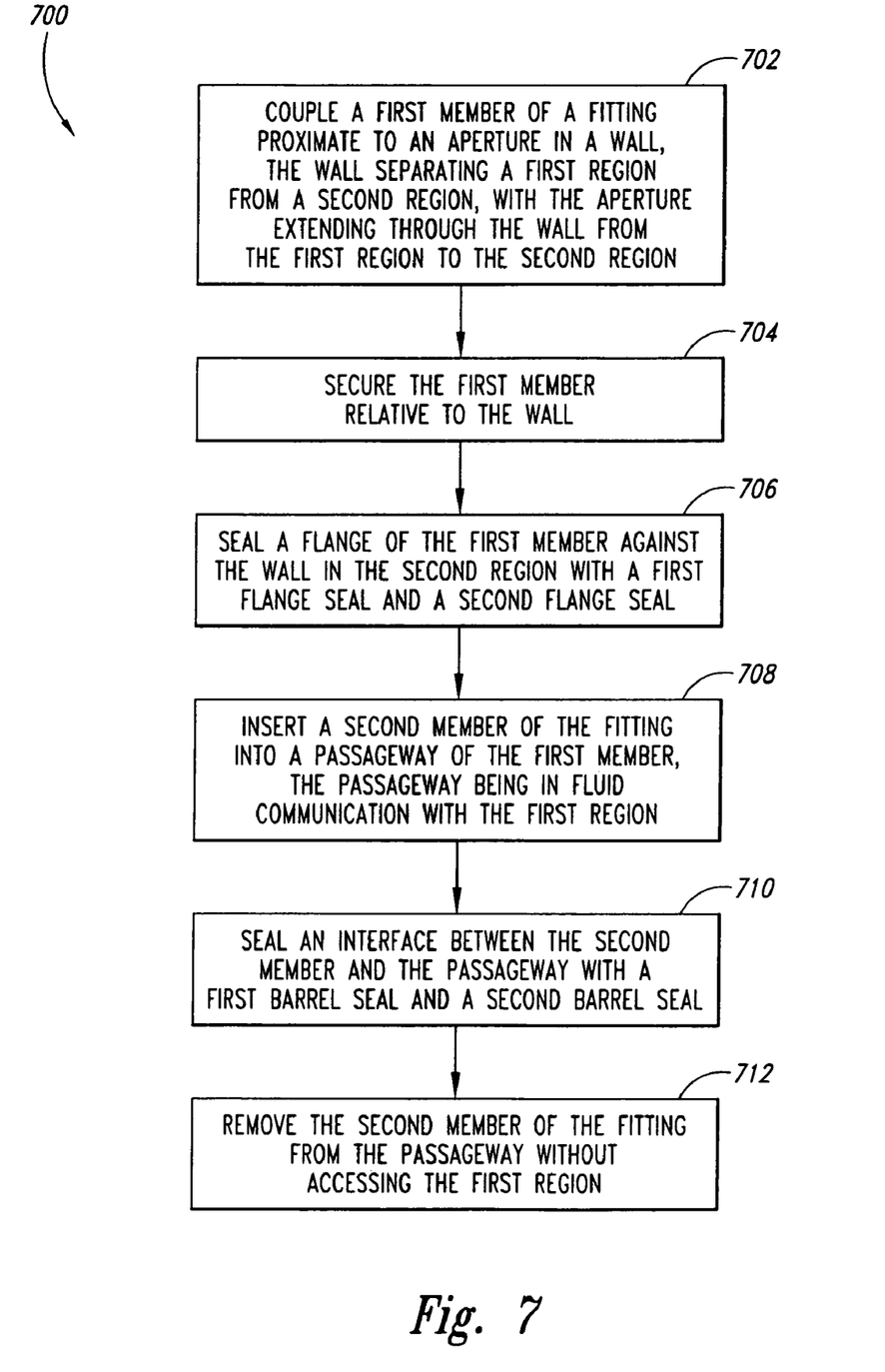
FIG. 7 is a flow diagram illustrating a method for installing a fitting in accordance with still another embodiment of the invention.

FIG. 7 is flow diagram illustrating a process 700 for installing and, optionally, removing a fitting in accordance with an embodiment of the invention. The process 700 can include coupling a first member of a fitting proximate to an aperture in a wall (process portion 702). The wall can separate a first region from a second region, and the aperture can extend through the wall from the first region to the second region. In a particular embodiment, process portion 702 can also include inserting a barrel portion of the first member into the aperture. The process can further include securing the first member relative to the wall (process portion 704). In a particular embodiment, process portion 704 can include fastening the first member from the first region. In other embodiments, the first member can be fastened from the second region.

In process portion 706, the process can include sealing a flange of the first member against the wall in the second region, with a first flange seal and a second flange seal. The first and second flange seals can be positioned annularly with respect to each other, for example, as described above with reference to FIG. 2. The process 700 can still further include inserting a second member of the fitting into a passageway of the first member, with the passageway being in fluid communication with the first region (process portion 708). An interface between the second member and the passageway can be sealed with a first barrel seal and a second barrel seal (process portion 710). For example, this interface can be sealed with two barrel seals that are axially disposed with respect to each other, as described above with reference to FIG. 2.

In a particular aspect of an embodiment shown in FIG. 7, the process can further include removing the second member of the fitting from the passageway without accessing the first region (process portion 712). For example, referring to FIG. 3B, the second member 132 can be threadably separated from the first member 131 by accessing the second region 116b, and without accessing the first region 116a. In particular, a user removing the second member 132 need not remove the first member 131 and need not access the fastener 144 that secures the first member 131 to the tank wall 114.

One feature of at least some embodiments of the fittings described above with reference to FIGS. 1-7 is that they can include redundant seals. For example, the first and second flange seals can be located at different points along a radially extending potential leak path that passes between the flange and the surface it abuts. If one of the flange seals fails, the other can still prevent leakage along the leak path. In a generally similar manner, the first and second barrel seals can be located along an axially extending potential leak path extending along the inner surface of the barrel, and if either barrel seal fails, the other can prevent leakage along this path. An advantage of this feature is that it allows certain structures (e.g., fuel tanks) to be penetrated while preserving compliance with requirements for redundant seals. In particular embodiments, this arrangement can allow sensors to have access to the interior of fuel tanks, without compromising a requirement for redundant seals in an external area (e.g., a pressurized compartment 104) outside the fuel tank. The redundant seals can be fluid-tight (e.g., liquid-tight and/or gas-tight).

Another feature of at least some embodiments of the fittings described above with reference to FIGS. 1-7 is that they can be installed and removed with common hand tools. For example, the connections between the first and second members described above can be threaded connections that can be secured and released with wrenches or other suitable hand tools. An advantage of this arrangement is that it can reduce the time and expense associated with installing and removing such devices.

Still another feature of at least some embodiments of the fittings described above with reference to FIGS. 1-7 is that the seals can be positioned so as to reduce or eliminate the likelihood for damage to the seals during installation or removal. For example, the flange seals 137a, 137b can be installed and removed without having the seals "roll" or otherwise rub against surfaces that might cause the seals to become displaced. The first barrel seal 139a can be located against a seat 146 to prevent it from rolling during installation or removal. The second barrel seal 139b can be held captive in a seal groove 148 and can be further secured with back up rings 143 to prevent it from rolling out of position during installation and/or removal.

Still another feature of at least some embodiments of the fitting described above with reference to FIGS. 1-7 is that part of the fitting can be removed without necessarily removing the entire fitting, and without requiring access to both sides of the tank wall 114 or other structure in which the fitting is positioned. For example, the second member 132 can be removed without requiring removal of the first member 131. Furthermore, the second member 132 can be removed by accessing the second region 116b, and without accessing the first region 116a.

From the foregoing, it will be appreciated that specific embodiments of the invention have been described herein for purposes of illustration, but that various modifications may be made without deviating from the invention. For example, the first and second members described above can have different arrangements, while still providing redundant seals. The fittings can be attached to structures other than fuel tanks and shrouded conduits, and can handle fluids other than fuel. The fittings may be used in aircraft other than tanker aircraft, and/or in non-aircraft installations. Aspects of the invention described in the context of particular embodiments may be combined or eliminated in other embodiments. For example, the fittings can be used with both integral sensors and remote sensors, or without sensors. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. An aircraft system, comprising
    a fuel tank having a tank wall with an inner surface, an outer surface, and an aperture extending from the inner surface to the outer surface; and
    a fluid-tight fitting positioned in the aperture, the fitting including:
        a first member having a flange and a barrel, the flange being aligned generally parallel with the tank wall, the barrel having a first portion extending through the tank aperture and a second portion extending away from the tank, the barrel further having a passageway;
        a fastener connected to the first portion of the barrel;
        a first flange seal between the flange and the tank wall;
        a second flange seal between the flange and the tank wall, the second flange seal being disposed generally radially outwardly from the first flange seal;
        a second member positioned within the passageway of the barrel;
        a first barrel seal positioned between the second member and barrel; and
        a second barrel seal positioned between the second member and the barrel.

2. The system of claim 1 wherein the second member includes a sensor.

3. The system of claim 1 wherein the second member has an internal passageway coupled to the passageway of the barrel.

4. The system of claim 1 wherein the fluid-tight fitting is a first fluid-tight fitting, and wherein the fuel tank is coupled to a fuel line having an inner conduit and an outer conduit disposed outwardly from the inner conduit, and wherein the outer conduit has an outer conduit aperture, and wherein the system further comprises a second fluid-tight fitting in fluid communication with the outer conduit aperture, the second fluid-tight fitting having a barrel portion sealably coupled to the outer conduit with a third barrel seal and a fourth barrel seal.

5. The system of claim 4 wherein the second fluid-tight fitting includes a sensor, and wherein the sensor is in fluid communication with the outer conduit, but not the inner conduit.

6. The system of claim 1 wherein a potential leak path is located between the first member and the second member and wherein the first barrel seal is positioned at a first location along the potential leak path, with the second barrel seal positioned at a second location along the potential leak path, the second location being spaced apart from the first location, the second seal providing a redundant seal in the event of a failure of the first seal.

7. The system of claim 1, wherein:
    the inner surface of the fuel tank is adjacent to an inner region of the fuel tank and the outer surface of the fuel tank is adjacent to an outer region of the fuel tank; and
    the fastener is accessible from the inner region of the fuel tank, but not the outer region, and wherein the second member includes a pressure sensor accessible from the outer region of the fuel tank but not the inner region, the second member being removable from the first member from the outer region of the fuel tank, but not from the inner region.

8. The system of claim 1 wherein the first and second flange seals include O-rings disposed annularly relative to each other.

9. The system of claim 1 wherein the first and second barrel seals include O-rings disposed axially relative to each other.

10. An aircraft system, comprising:
    an aircraft fuel line having an aperture and a flow axis generally transverse to the aperture at the aperture; and
    a fluid-tight fitting positioned at the aperture, the fitting including;
        a first member having a flange with a flange face, and a barrel with a passageway;
        a first flange seal at the flange face, the first flange seal being positioned to sealably couple to a surface disposed generally radially outwardly from the aperture;
        a second flange seal at the face of the flange, the second flange seal being disposed generally radially outwardly from the first flange seal and being positioned to sealably couple to the surface;
        a second member positioned within the passageway of the barrel;
        a first barrel seal positioned between the barrel and second member; and
        a second barrel seal positioned between the barrel and the second member.

11. The system of claim 10 wherein a potential leak path is located between the first member and the second member and wherein the first barrel seal is positioned at a first location along the potential leak path, with the second barrel seal positioned at a second location along the potential leak path, the second location being spaced apart from the first location, the second seal providing a redundant seal in the event of a failure of the first seal.

12. The system of claim 10 wherein the fuel line includes an inner conduit positioned annularly within an outer conduit, and wherein the passageway of the barrel is in fluid communication with the inner conduit but not the outer conduit.

13. The system of claim 10 wherein the fuel line includes an inner conduit positioned annularly within an outer conduit, and wherein the passageway of the barrel is in fluid communication with the outer conduit but not the inner conduit.

14. The system of claim 10 wherein the second member positioned within the passageway of the barrel includes a sensor.

15. A method for installing a fluid fitting in an aircraft fuel system, comprising:
coupling a first member of a fluid fitting proximate to an aperture in a wall, the wall separating a first region from a second region, with the aperture extending through the wall from the first region to the second region, the wall being a wall of at least one of (a) an aircraft fuel tank and (b) an aircraft fuel line having a flow axis generally transverse to the aperture at the aperture;
securing the first member relative to the wall;
placing a flange of the first member proximate to the wall in the second region, with a first flange seal and a second flange seal positioned between the flange and the wall, the second flange seal being generally radially outwardly from the first flange seal;
inserting a second member of the fitting into a passageway of the first member, the passageway being in fluid communication with the first region; and
sealing an interface between the second member and the passageway with a first barrel seal and a second barrel seal.

16. The method of example 15, further comprising removing the second member of the fitting from the passageway without accessing the first region.

17. The method of claim 15 wherein:
the wall includes a wall of a fuel tank, with the first region being within the fuel tank and the second region being external to the fuel tank;
securing the first member includes securing the first member from a position within the fuel tank;
sealing a flange includes sealing the flange with a first O-ring seal and a second O-ring seal positioned annularly outwardly from the first O-ring seal;
inserting a second member includes inserting a second member that includes a pressure sensor;
sealing an interface between the second member and the passageway includes sealing the interface with a third O-ring and a fourth O-ring spaced axially apart from the third O-ring along the passageway.

18. The method of claim 15 wherein coupling the first member includes coupling the first member to a fuel tank.

19. The method of claim 15 wherein coupling the first member includes coupling the first member to a fuel line.

20. The method of claim 15 wherein coupling the first member includes coupling the first member to a fuel line having an inner conduit and an outer conduit disposed annularly around the inner conduit, with the passageway being in fluid communication with the inner conduit but not the outer conduit.

21. The method of claim 15 wherein coupling the first member includes coupling the first member to a fuel line having an inner conduit and an outer conduit disposed annularly around the inner conduit, with the passageway being in fluid communication with the outer conduit but not the inner conduit.

22. The method of claim 15, further comprising sealing an interface between the flange and the wall with the first flange seal until the first flange seal fails, and sealing the interface between the flange and the wall with the second flange seal after the first flange seal fails.

23. The method of claim 15, further comprising sealing the interface between the second member and the passageway with the first barrel seal until the first barrel seal fails, and sealing the interface between the second member and the passageway with the second barrel seal after the first barrel seal fails.

* * * * *